April 26, 1966  L. PERAS  3,247,616
WINDOW-REGULATORS OF VEHICLES
Filed Jan. 2, 1964  2 Sheets-Sheet 1
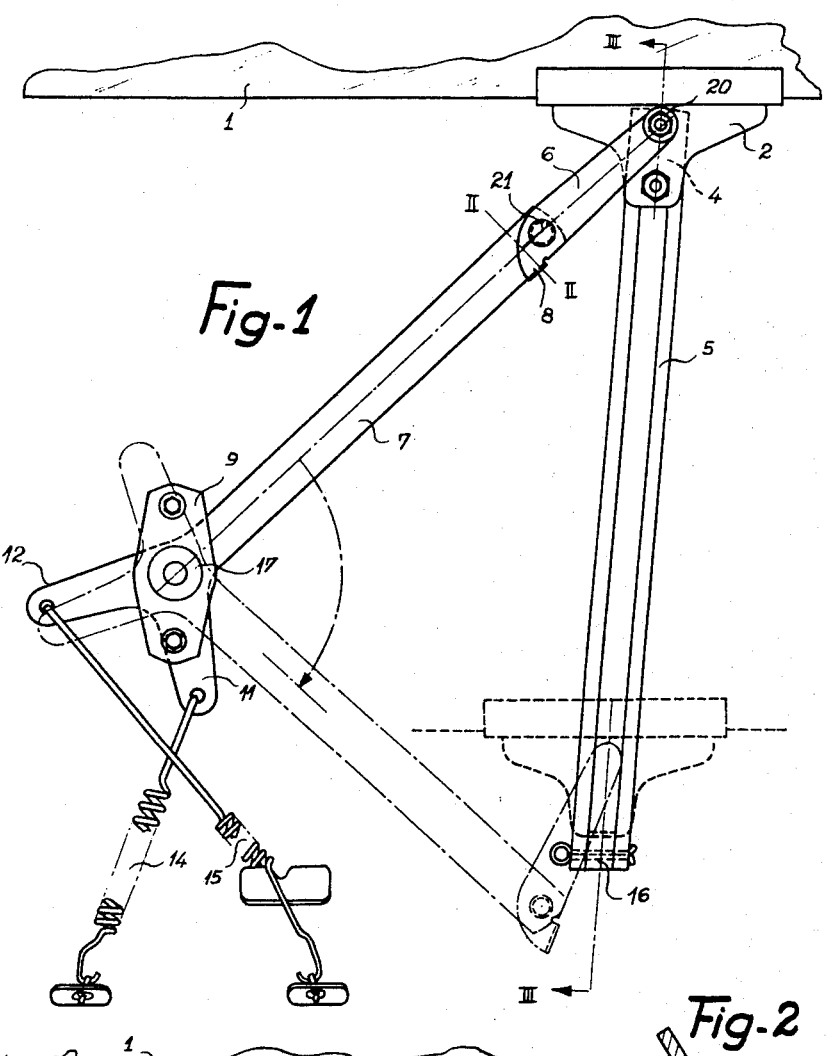
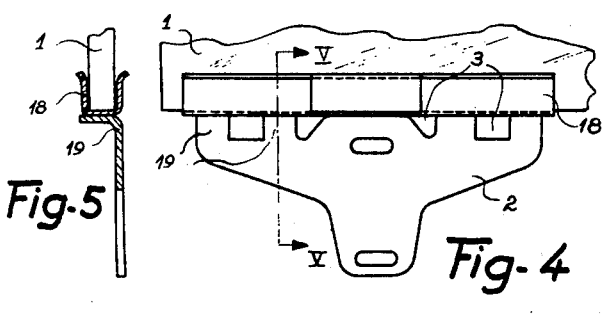
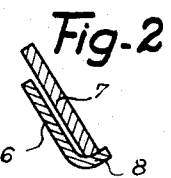
Inventor
Lucien Peras
By Stevens, Davis, Miller & Mosher
Attorneys

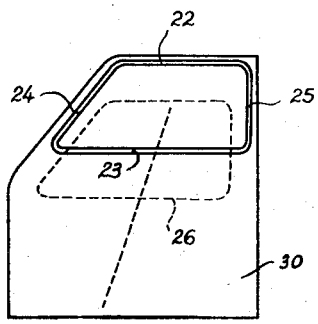
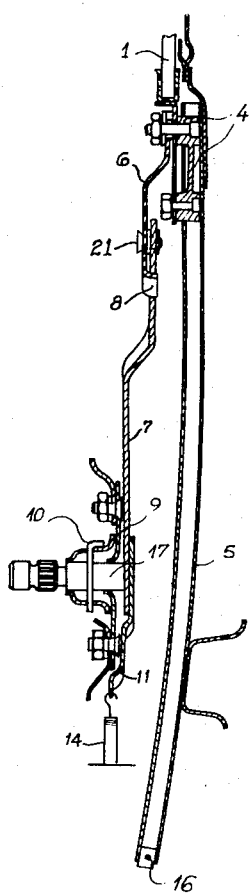
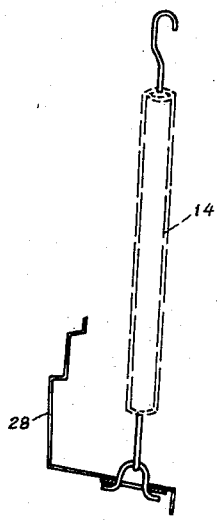

United States Patent Office 3,247,616
Patented Apr. 26, 1966

3,247,616
WINDOW-REGULATORS OF VEHICLES
Lucien Péras, Billancourt, France, assignor to Regie Nationale des Usines Renault, Billancourt, France
Filed Jan. 2, 1964, Ser. No. 335,213
Claims priority, application France, Jan. 10, 1963, 921,016, Patent 1,353,533
7 Claims. (Cl. 49—40)

Glass windows of vehicles are known wherein the weight of the glass is substantially compensated in all positions, means being provided for locking the glass in its uppermost or closed position to prevent the opening thereof from the outside. Such window regulators comprise either cable and pulley transmission mechanisms, or devices comprising at least two relatively sliding or pivoting members or portions, which are a source of wear and generally regarded as detrimental from the point of view of smoothness of operation.

To avoid these drawbacks this invention provides a glass window regulator wherein the only sliding member is a glass-carrying device such as a strap or gusset movable along a guide member fixed solid to the body panel of a vehicle for example in the form of a slideway or slotted arm mounted on a vehicle body panel, the movements of this strap or gusset being controlled by means of a short arm pivoted on a control lever solid with a pin adapted to revolve in a bearing carried by the vehicle door, so that the rotation of this pin entails the pivotal movement of said lever and therefore the movement of translation of said glass-carrying device.

The glass weight is compensated by means of a pair of springs pulling the ends of a relevant pair of bell-crank arms extending substantially at right angles to each other and rotatably solid with the aforesaid control pin fixed to the door.

To lock the glass in its wound up or closed position, a stop member is provided on said short arm and engageably by said control lever after said control lever and short arm have overstepped their relative dead center position.

Furthermore, this invention provides the following complementary features:

(1) The glass is released in its wound up or closed position, in relation to its weatherstrips, by setting the aforesaid slotted arm in an inclined position relative to its lateral weatherstrips.

(2) During the glass movements, the glass pivots slightly about a substantially horizontal axis, thus generating an envelope corresponding in shape to the door curvature. This is obtained very simply by giving a curved configuration to said slotted arm and a certain elasticity to said glass-carrying strap or gusset.

A typical form of embodiment of the window regulator of this invention will now be described by way of example with reference to the accompanying drawings, in which:

FIGURE 1 is an elevational view of the window regulator;

FIGURE 2 is a section taken upon the line II—II of FIG. 1 across the short arm and control lever, in close proximity of their pivotal connection;

FIGURE 3 is a sectional view of the window mounted on the vehicle door, the section being taken upon the line III—III of FIGURE 1;

FIGURE 4 is a front view of the glass-carrying strap or gusset;

FIGURE 5 is a section of the same member which is taken upon the line V—V of FIGURE 4;

FIGURE 6 is a sectional view showing a detail of the anchorage of one of the compensation springs on the box-sectioned door, and FIGURE 7 is a general view of the door, showing on a smaller scale the movement of the glass with respect to the window frame.

The window of this invention comprises (see FIGURES 1 and 3) a strap or gusset 2 supporting the glass 1, this strap 2 being secured on a shoe 4 adapted to slide in smooth frictional contact along a slideway 5 consisting of a slotted arm or like member, said slideway 5 being mounted on a vehicle body panel or door 30.

As shown more particularly in FIGURES 4 and 5 of the drawings this strap 2 carries the glass 1 through the medium of a channel mounting element 18 in which the glass is clamped, this element 18 being connected to the strap body through portions 19 apertured at 3 to increase its elasticity.

Pivotally mounted on this strap 2 at 20 is a short arm 6 pivoted in turn at 21 on a control lever 7 rigid with a pin 17 adapted to revolve in a bearing 9 in which it is prevented from sliding axially by means of a fastening member 10, for example a circlip.

This pin 17 is connected through adequate transmission or driving means (not shown) to the control member (for example a crank handle or motor) of the glass regulator.

Moreover, this pin 17 is solid with a pair of extension arms shown by substantially perpendicular arms 11, 12 connected each to one end of a pair of traction springs 14, 15, respectively, the other end of each spring being anchored on the box-sectioned door structure 28, as shown notably in FIGURE 6.

The provision of these springs (see FIGURE 1) is such that they are caused to be tensioned and released in succession during the movement of rotation of said pin 17, whereby the resultant torque applied to this pin remains practically constant irrespective of the angular positions assumed by the said extension arms 11, 12 during the operation of the window regulator. This torque is calculated to compensate the weight of the glass and the friction resistance during the glass closing movement.

The short arm 6 carries an in-turned, stop-forming lip 8 limiting in the wound up position of the glass the permissible relative angular movement of this arm 6 and control lever 7 (FIGURE 2). This abutment becomes operative when the aforesaid elements 6, 7 are in their relative position slightly beyond their dead centre position, whereby the glass is locked in this position and cannot be lowered by an external pressure.

In this uppermost position of the glass the latter bears against its weatherstrips 22, 23, 24 and 25 (see FIGURE 7). To limit frictional contacts during the glass movement the glass is moved along a skew path through positions such as 26 (as shown in broken lines in FIGURE 7) so as to free completely the weatherstrips 22, 24 and 25.

In order to accommodate the door curvature, the slideway or slotted arm 5 is curved accordingly so that the glass 1 is caused to pivot slightly during its upward or downward travel, this slight pivotal movement being permitted by the elasticity of its connection with the strap 2.

To avoid detrimental shock at the end of its downward stroke the shoe 4 is adapted to engage a resilient stop member 16 located at the bottom of slideway 5.

Of course, various modifications and variations may be resorted to in the practical embodiment of the window of this invention without inasmuch departing from the spirit and scope of the invention as set forth in the appended claims.

I claim:
1. A device for raising and lowering a glass window through a vehicle body panel comprising a guide member secured to said body panel, a glass carrying device mounted to slide in said guide member, a pin mounted on said body panel, a control lever pivotally mounted on said pin, said control lever including a long arm portion extending away from said pivoting point and a short arm portion pivotally joined by one end to said long arm portion and the other end pivotally joined to said glass carrying device, a stop-member lip defined in said short arm portion to limit rotational displacement of said portion in relation to said long arm so that the angle defined by said portions attains a value slightly above 180° to assure locking of the window when moved to an uppermost position, first and second extension arms on said control lever defined at a point remote from said short arm portion, first and second traction springs, each spring having an upper end thereof attached to one of said extension arms, each lower end of said traction springs being anchored to a respective separate point on said body panel, said extension and anchoring points being adapted to operably maintain constant the torque applied to said control lever irrespectively of the angular position imparted to said control level and said glass window.

2. A window as in claim 1, wherein the respeceive lengths of the long arm portion and the short arm portion of said control lever are adapted to allow said structures to rest in substantial elongated oblique alignment when the glass is in its uppermost position.

3. A window as in claim 1, wherein said extension arms define a pair of short arms extending away from the pivoting point of said control lever in a direction substantially opposite to that of said long arm portion.

4. A window as in claim 1, wherein said body panel and said guide member are curved in substantial registry.

5. A window as in claim 1, wherein said window is of trapezoidal shape having two lateral converging sides and two parallel substantially horizontal sides, the shorter of said parallel sides corresponding to the upper section of said window, said window further including a number of lateral weather strippings mounted on said body panel.

6. A window as in claim 1, wherein said body panel is a vehicle door.

7. A window as in claim 6, wherein said guide member is positioned in non-parallel intermediate orientation between the oriented position of said two lateral converging sides thus causing the glass to separate away from said lateral weather strippings at the initiation of a downward movement of said glass.

References Cited by the Examiner

UNITED STATES PATENTS

| | | | |
|---|---|---|---|
| 1,925,401 | 9/1933 | Nicholson | 268—126 X |
| 1,991,017 | 2/1935 | Hickman et al. | 268—126 X |
| 2,366,092 | 12/1944 | Floraday | 268—126 X |
| 2,478,523 | 8/1949 | Cadwallader | 268—126 |

FOREIGN PATENTS

| | | |
|---|---|---|
| 691,926 | 5/1953 | Great Britain. |
| 742,681 | 12/1955 | Great Britain. |

HARRISON R. MOSELEY, *Primary Examiner.*

J. K. BELL, *Assistant Examiner.*